US012746523B2

(12) United States Patent
Metzler et al.

(10) Patent No.: US 12,746,523 B2
(45) Date of Patent: Sep. 29, 2026

(54) VALVE DEVICE FOR INJECTING GAS INTO A MIXING CHAMBER OF A PLASTIC METERING DEVICE, AND PLASTIC METERING DEVICE

(71) Applicant: Henkel AG & Co. KGaA, Duesseldorf (DE)

(72) Inventors: Mario Metzler, Goetzis (AT); Guenter Baldauf, Hohenweiler (AT); Pascal Schneider, Moeggers (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 57 days.

(21) Appl. No.: 18/746,619

(22) Filed: Jun. 18, 2024

(65) Prior Publication Data

US 2025/0041814 A1 Feb. 6, 2025

Related U.S. Application Data

(63) Continuation of application No. PCT/EP2022/085909, filed on Dec. 14, 2022.

(30) Foreign Application Priority Data

Dec. 20, 2021 (EP) .................................... 21215927

(51) Int. Cl.
*B01F 35/71* (2022.01)
*B01F 23/20* (2022.01)
(Continued)

(52) U.S. Cl.
CPC .... *B01F 35/718051* (2022.01); *B01F 23/235* (2022.01); *B01F 23/291* (2022.01);
(Continued)

(58) Field of Classification Search
CPC ....... Y10T 137/7836; B01F 35/718051; B01F 35/712; B01F 23/291; B01F 23/235;
(Continued)

(56) References Cited

U.S. PATENT DOCUMENTS 5,447,173 A * 9/1995 Kazama ............... G05D 7/0635 251/129.08
5,938,079 A 8/1999 Wacker et al.
(Continued)

FOREIGN PATENT DOCUMENTS

DE 202008014823 U1 2/2009
DE 102011009034 A1 7/2012
(Continued)

OTHER PUBLICATIONS

International Search Report for International PCT Patent Application No. PCT/EP2022/085920—Mailing date: Apr. 20, 2023.
(Continued)

*Primary Examiner* — William M Mccalister
(74) *Attorney, Agent, or Firm* — Sun Hee Thomas

(57) ABSTRACT

A valve device for injecting gas into at least one component located in a mixing chamber is described. The valve device includes a pressure regulating valve and a flow regulator. An inlet of the pressure regulating valve is connected to an outlet of the flow regulator, and an outlet of the pressure regulating valve opens directly into the mixing chamber. The pressure regulating valve has a valve chamber, an actuator moveable in the valve chamber, and a piston unit coupled to the actuator to fix an axial position of the actuator based on a pressure in the valve chamber.

20 Claims, 3 Drawing Sheets

(51) Int. Cl.

| | |
|---|---|
| ***B01F 23/235*** | (2022.01) |
| ***B01F 101/00*** | (2022.01) |
| ***G05D 16/10*** | (2006.01) |

(52) U.S. Cl.
CPC ......... *B01F 35/712* (2022.01); *G05D 16/103* (2013.01); *B01F 2101/2805* (2022.01)

(58) Field of Classification Search
CPC ......... B01F 2101/2805; F16K 17/0446; F16K 31/08; F16K 31/0847; F16K 31/086
USPC .......................................................... 137/510
See application file for complete search history.

(56) References Cited

U.S. PATENT DOCUMENTS

| | | | | |
|---|---|---|---|---|
| 6,311,718 | B1 * | 11/2001 | Hafner ................ | F16K 31/3855 137/907 |
| 6,635,200 | B2 | 10/2003 | Sulzbach et al. | |
| 10,343,123 | B2 | 7/2019 | Metzler et al. | |
| 10,946,350 | B2 | 3/2021 | Metzler | |
| 11,034,059 | B2 | 6/2021 | Schwabl et al. | |
| 11,629,432 | B2 * | 4/2023 | Waechter ............ | C23C 16/4482 117/200 |
| 2002/0143318 | A1 * | 10/2002 | Flinchbaugh ..... | A61M 5/16881 604/179 |
| 2009/0236025 | A1 | 9/2009 | Burkus et al. | |
| 2018/0339439 | A1 * | 11/2018 | Yusa .................. | B29C 44/3446 |
| 2020/0307026 | A1 | 10/2020 | Metzler | |
| 2021/0178648 | A1 | 6/2021 | Naito et al. | |

FOREIGN PATENT DOCUMENTS

| | | | |
|---|---|---|---|
| DE | 102018213484 | A1 | 2/2020 |
| EP | 0723816 | A2 | 7/1996 |
| EP | 1186391 | A1 | 3/2002 |
| EP | 1287964 | A1 | 3/2003 |
| EP | 1958750 | A2 | 8/2008 |
| JP | H11293027 | A | 10/1999 |
| JP | 2003305757 | A | 10/2003 |
| WO | 2016087968 | A1 | 6/2016 |
| WO | 2016087969 | A1 | 6/2016 |
| WO | 2017004636 | A1 | 1/2017 |
| WO | 2017004637 | A1 | 1/2017 |

OTHER PUBLICATIONS

International Search Report for International PCT Patent Application No. PCT/EP2022/085909—Mailing date: Feb. 10, 2023.

International Search Report for International PCT Patent Application No. PCT/EP2022/085927—Mailing date: Feb. 10, 2023.

* cited by examiner

VALVE DEVICE FOR INJECTING GAS INTO A MIXING CHAMBER OF A PLASTIC METERING DEVICE, AND PLASTIC METERING DEVICE

FIELD OF THE INVENTION

The invention relates to a valve device for injecting gas into a mixing chamber of a plastic metering device. Furthermore, the invention relates to a plastic metering device for metering out a foamed or foamable plastic in a preferably discontinuous manner.

BACKGROUND

WO 2017/004637 A1 discloses a plastic metering device having a mixing chamber in which the plastic components polyol and isocyanate can be mixed to produce polyurethane. The polyurethane can be metered out of a closable outlet opening in the mixing chamber through a nozzle. In order to promote foaming of the polyurethane, the polyol is loaded with air before entering the mixing chamber, and the air is bound in dissolved form in the polyol. When the polyol enters the mixing chamber and the mixing chamber pressure is below the saturation pressure of the dissolved air, the air bubbles out, forming small air bubbles. These air bubbles form nuclei for the foam cells. However, the extent to which the air bubbles out depends upon the mixing chamber pressure, which is subject to fluctuations during discontinuous metering. This can lead to different qualities of the foam structure of the polyurethane.

A device for loading a plastic component with a gas is known from WO 2016/087968 A1. The device comprises a pressure vessel with a mixer. Compressed air is fed into the pressure vessel via a valve device, wherein the valve device primarily serves as a control connection in order to keep the pressure level in the pressure vessel at a desired level. The compressed air is fed via the valve device into a portion of the pressure vessel that is located above a liquid level in the plastic component. In addition, compressed air is injected directly into the liquid plastic component via a gas loading ring arranged below the liquid level. Loading the plastic component with air in this way is usually very time-consuming. The device of WO 2016/087969 A1, on the other hand, is unlikely to be suitable for rapid adjustments of the loading state according to process parameters. Discontinuous operation could also cause problems. For example, there is a risk that the plastic component will penetrate the gas loading ring and cause contamination or blockages if the compressed air is switched off during a break between two metering processes.

SUMMARY OF THE INVENTION

The invention is therefore based upon the object of providing a suitable valve device for injecting gas into a mixing chamber of a plastic metering device, and a plastic metering device for metering out a foamed or foamable plastic in a preferably discontinuous manner.

The object of the invention is achieved by the combination of features according to claim 1 and claim 14. Exemplary embodiments of the invention can be found in the dependent claims.

According to the invention, it is provided that the valve device comprise a pressure regulating valve and a flow regulator, wherein an inlet of the pressure regulating valve is connected to an outlet of the flow regulator, and an outlet of the pressure regulating valve is suitable for opening preferably directly into the mixing chamber. The opening of the outlet is not to be understood as being restricted in the sense that the outlet of the pressure regulating valve must necessarily be adjacent to the mixing chamber in order to open into it. Of course, embodiments are also conceivable in which suitable connecting regions are used between the outlet and the mixing chamber to create an opening, e.g., a channel, thereof. The pressure regulating valve has a valve chamber and an actuator that can be moved in the valve chamber as a valve piston, as well as a piston unit coupled to the actuator. The piston unit allows an axial position of the actuator to be fixed according to the pressure in the valve chamber. This fixation does not necessarily mean an active positioning of the actuator in the sense of a direct control of the actuator. Rather, the actuator position adjusts itself automatically based upon the prevailing force conditions. For example, a fixation can be made possible by a balance between the pressure prevailing in the valve chamber and the pressure built up by the piston unit.

In a preferred embodiment, the pressure regulating valve can be designed as a needle valve, wherein a valve chamber and, as an actuator, a needle displaceable in the valve chamber and a piston unit coupled to the needle are provided. In this case, a needle valve is a control valve in which a control gap is modified by the axial movement of a needle or a needle-like actuator. Alternatively, the pressure regulating valve can also be designed as an adjustable, in particular spring-loaded, check valve.

The pressure regulating valve makes it possible to maintain a constant pressure, largely independent of the mixing chamber pressure, at the outlet of the flow regulator, which is connected to the valve chamber via the inlet of the pressure regulating valve. Even if means are provided on an inlet of the flow regulator to keep the pressure prevailing there constant, the flow regulator has constant pressure conditions at the inlet and outlet, which makes it possible to provide a very precise flow. Overall, the valve device according to the invention can provide a very precise quantity of air per unit of time. With this precisely adjusted quantity of air, plastics with a good and consistent foam structure can be produced in the mixing chamber.

The flow regulator is preferably designed as a mass flow controller (MFC). It determines the mass flow so that fluctuations in pressure and temperature have no influence on the outcome of the regulation action. Preferably, the mass flow controller has a calorimetric flow meter as a measuring sensor.

The piston unit may comprise a pressure guide piston and a closing piston. The pressure guide piston is used to regulate the pressure. On the one hand, a first force which depends upon the pressure in the valve chamber can act upon the pressure guide piston. Preferably, the first force is proportional to the pressure prevailing in the valve chamber. On the other hand, a second force which can be precisely adjusted using adjustment devices acts upon the pressure guide piston. If the pressure guide piston is in equilibrium, the actuator in the valve chamber is not moved and remains stationary. If the valve chamber pressure is too low, the pressure guide piston and thus the actuator coupled to it move in one direction, wherein the flow conditions in the pressure regulating valve change in such a way that the valve chamber pressure increases again. The pressure guide piston then moves again in the other direction until an equilibrium is established between the first force and the second force. This allows regulating the valve chamber pressure, the level or setpoint of which depends upon the set second force. The pressure regulating valve can be closed using the closing piston. Preferably, the pressure regulating valve can thus be closed independently of the valve chamber pressure.

A spring element can be arranged between the pressure guide piston and a preferably adjustable abutment. For example, the spring element can be a coil spring. When using an adjustable abutment, the distance between the pressure guide piston and the abutment can be changed by adjusting the abutment, so that the coil spring is compressed to a greater or lesser degree. The force exerted by the spring element and/or the coil spring on the pressure guide piston changes accordingly. As an alternative to the spring element or the coil spring, the adjustable second force can also be provided by other means such as pneumatics. Another possibility is the use of a non-adjustable abutment. This allows for particularly simple installation. Costs can be reduced, and incorrect operation can be precluded.

In one exemplary embodiment, in a closed position of the actuator, the closing piston presses against the pressure guide piston, which in turn presses against the actuator and holds it in the closed position. The force with which the closing piston presses against the pressure guide piston is preferably significantly greater (greater than a factor of 2 or 5) than the force exerted on the pressure guide piston by the spring element described above. This allows the pressure regulating valve to be closed quickly and reliably by the closing piston.

A spring can push the closing piston into a rest position in which the closing piston and the pressure guide piston are decoupled from each other. In the rest position of the closing piston, no forces that can be attributed to the closing piston act upon the pressure guide piston.

The actuator, the pressure guide piston, and the closing piston can be arranged coaxially with each other. In addition, the preferably adjustable abutment can also be arranged coaxially with the pressure guide piston. When an adjustable abutment is used, it is preferably a screw sleeve with an axial position that can be adjusted by a rotary movement via a screw thread. This enables a very precise adjustment of the axial position of the abutment and thus of the pressure in the valve chamber.

In one exemplary embodiment, the valve chamber is delimited by a membrane which is arranged between the actuator and the piston unit. The membrane enables a good seal between the valve chamber and the piston unit. The membrane can have a special wave structure that ensures a good fit and seal. In an alternative embodiment, a clamp is provided for the membrane. This causes the membrane to corrugate to ensure a good fit and seal.

The actuator is preferably coupled to the piston unit by magnetic force. Magnets can be arranged on two opposite sides of the membrane, with the magnetic force acting through the membrane. To attach the actuator to the piston unit, it is therefore not necessary to pierce the membrane between them. This reduces the risk of the membrane leaking. Of course, the use of a magnet on one side and a ferromagnetic counterpart on the opposite side is also conceivable.

In one exemplary embodiment, the actuator is made of plastic, preferably PEEK. This allows, when the actuator is in its closed position, a good seal between the actuator and a valve housing that defines the valve chamber. In particular, it is then not possible for the material in the mixing chamber to penetrate into the pressure regulating valve.

A volume between the outlet of the flow regulator and the outlet of the pressure regulating valve can be less than 5 $cm^3$, preferably less than 1 $cm^3$. This minimizes harmful compressibility effects of the (gas) volume, which make it difficult to precisely control the quantity of air injected.

A check valve may be provided between the outlet of the flow regulator and the inlet of the pressure regulating valve. The check valve prevents material from the mixing chamber from entering the typically very sensitive flow regulator in the event of a defective pressure regulating valve.

A booster unit can be provided in front of the inlet of the flow regulator, compressing the air pressure of a conventional compressed air supply network from about 5 to 7 bar to about 7 to 30 bar. To compensate for any pressure fluctuations that may occur during operation of the booster unit, a large buffer volume can be provided between the booster unit and the inlet of the flow regulator. The large buffer volume can be created, for example, by using hose pieces with an oversized diameter and long length.

The plastic metering device according to the invention for the preferably discontinuous metering of a foamable or foamed plastic has a valve device as described above in the various embodiments. "Discontinuous metering" is intended to cover cases in which the plastic is metered with a constant output (weight/time unit) for a limited time interval—for example, of a few seconds. Such a metering may be followed by a pause during which no plastic is metered. Discontinuous metering can therefore be a result of metering processes of varying lengths, and of intervening metering pauses of varying lengths. It is also possible that the output varies during a metering process or from metering process to metering process.

BRIEF DESCRIPTION OF THE DRAWINGS

The invention is explained in more detail with reference to the embodiments shown in the drawings. In the figures.

DETAILED DESCRIPTION

Figure 1:
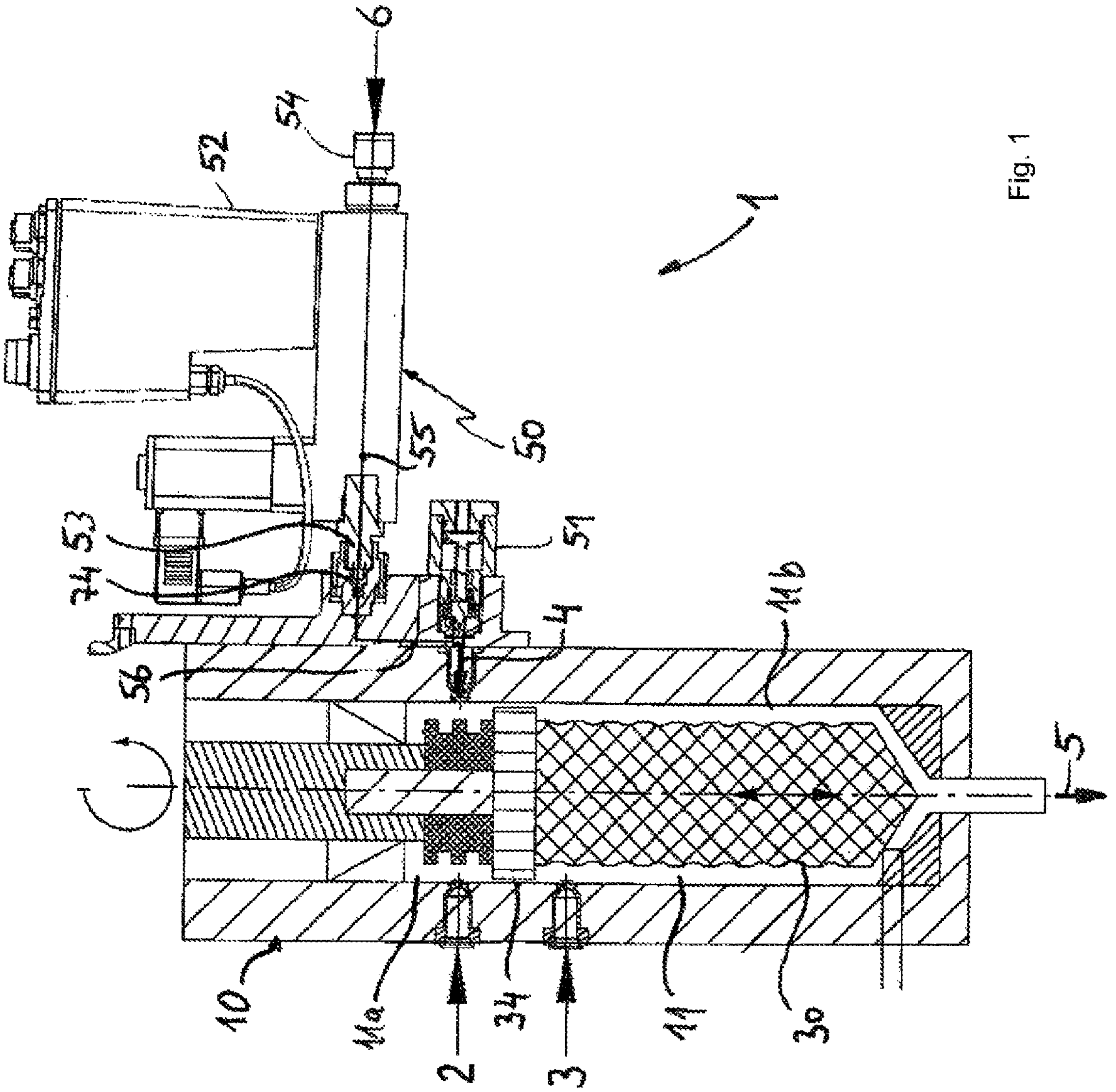
FIG. 1 shows a plastic metering device according to the invention.

FIG. 1 schematically shows a plastic metering device which is denoted in its entirety by 1. The plastic metering device 1 serves for the preferably discontinuous metering of a plastic which is already (partially) foamed when dispensed from the plastic metering device 1, or which foams or continues to foam after dispensing.

The plastic metering device 1 comprises a mixing device 10 and a valve device 50. In the mixing device 10, a first component 2 and a second component 3 can be fed into a mixing chamber 11 in which a rotatably mounted stirrer 30 is arranged. In the mixing chamber 11, the two components 2, 3 are mixed together to form a plastic 5. For example, the first component 2 can be a mixture of polyol and water, which reacts with isocyanate as the second component 3 in the mixing chamber 11 to form polyurethane. This produces $CO_2$, which causes the polyurethane to foam, or it can (continue to) foam after it has been metered out of the mixing chamber 11.

In addition, a gas 4 is fed to the mixing chamber 11, the quantity of which is precisely regulated by the valve device 50. For this purpose, the valve device 50 has a pressure regulating valve 51 and a flow regulator in the form of a mass flow controller 52, which are connected to one another by a connection unit 53. A pressurized expanding gas 6 is supplied to an inlet 54 of the mass flow controller 52.

The gas 4 is injected directly into a first mixing region 11*a* of the mixing chamber 11 and mixed or finely distributed into the first component 2 by the stirrer 30. This creates small microbubbles in the first component 2. The premixture then flows via a gap 34 into a second mixing region 11*b* of the mixing chamber 11. The microbubbles promote a particularly homogeneous and fine foam structure, which is described in more detail below.

An outlet 55 of the mass flow controller 52 is connected to an inlet 56 of the pressure regulating valve 51 via the connection unit 53.

Figure 2:
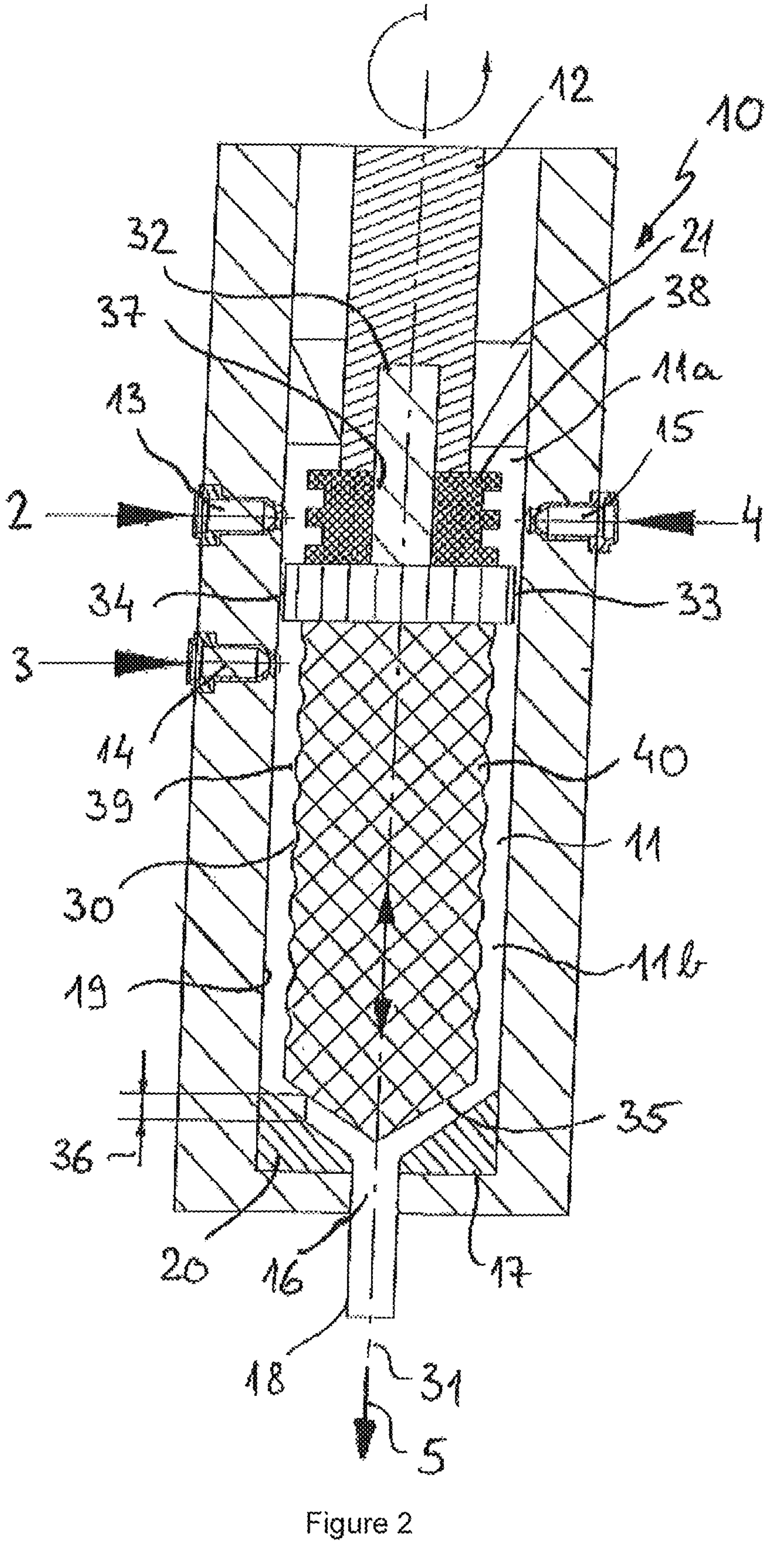
FIG. 2 shows a mixing device of the plastic metering device.

FIG. 2 shows the mixing device 10 in isolation. The stirrer 30 is in this case substantially rotationally symmetrical with respect to an axis of rotation 31. The stirrer 30 is driven by a drive shaft 12, which is only partially shown. The stirrer 30 has a pin-shaped shaft connection 32 for the connection to the drive shaft 12. Preferably, the connection between the drive shaft 12 and the shaft connection 32 is a non-positive connection.

Three inlet openings are provided in the housing of the mixing device 1: for one, there is a first inlet opening 13 through which the first component 2 can be fed into the mixing chamber 11. A second inlet opening 14 for the second component 3 is provided at an axial distance from the first inlet opening 13. The axial distance between the first inlet opening and the second inlet opening 14 can be a few millimeters—for example, 3 to 20 mm.

At the same axial height as the first inlet opening 13, a gas inlet opening 15 is provided, through which the gas 4 can be injected into the mixing chamber 11. The gas 4 is preferably air (the gas can also be nitrogen or $CO_2$).

The plastic or polyurethane foam exits the mixing chamber 11 through an outlet opening 16, which is arranged coaxially with the axis of rotation 31 and is located at an axial end 17 of the mixing chamber 11. The outlet opening 16 is formed by a nozzle 18. An inner diameter of the nozzle 18 can, for example, be 1 to 8 mm or 2 to 5 mm. A length of the nozzle 18 can be 2 to 50 mm or 30 mm. The produced plastic exits the mixing chamber 11 in an axial direction.

The stirrer 30 has a cylindrical shaft collar 33, the outer diameter of which is slightly smaller than an inner diameter of the cylindrical mixing chamber 11. The radial gap 34 between the shaft collar 33 and a mixing chamber wall 19 can be regarded as part of a throttle or flow brake, by which the mixing chamber 11 is divided into the first mixing region 11*a* and the second mixing region 11*b*.

The stirrer 30 can be moved in the axial direction (in the direction of the axis of rotation 31). FIG. 2 shows the stirrer 30 in an axial position in which an outlet gap 36 is provided between a conical stirrer tip 35 of the stirrer 30 and a funnel-shaped insert 20 which is arranged at the axial end 17 of the mixing chamber 11. As a result, it is possible for the plastic that has been produced in the mixing chamber 11 to exit the mixing device 1 through the nozzle 18. In a closed position, the conical stirrer tip 35 rests on the insert 20, thereby closing the outlet gap 36. In the closed position of the stirrer 30, the outlet opening 16 is thus closed. The axial extension of the gap between the stirrer tip 35 and the insert 20 can assume values between 0 mm (closed position) and 2.5 mm. The axial position of the stirrer 30 and/or the axial extension of the outlet gap 36 can be used to set a specific pressure in the mixing chamber 11. Means for precisely adjusting the axial position of the stirrer 30 are not shown in FIG. 2.

The axial stroke or gap (difference between the closed position and an upper end position) is dimensioned such that the shaft collar 33 and/or the flow brake is always located between the first inlet opening 13 and the second inlet opening 14 when viewed in the axial direction. As a result, the first inlet opening 13 and the gas inlet opening, which is offset by 180° in this exemplary embodiment, always open into the first mixing region 11*a* of the mixing chamber 11. The second inlet opening 14, however, always opens into the second mixing region 11*b*, regardless of the axial position of the stirrer 30.

For dividing the gas 4 and/or for mixing it with the first component 2, the stirrer 30 has first means 38 on a first axial portion 37. The first axial portion 37 of the stirrer 30 is located in the first mixing region 11*a* of the mixing chamber 11. The first mixing region 11*a* is delimited by the shaft collar 33 and a seal 21 which is inserted between the drive shaft 12 and the mixing chamber wall 19. In a second axial portion 39, which extends from the shaft collar 33 to the stirrer tip 35, second means 40 are provided for mixing a premixture, comprising the first component 2 and the gas 4, with the second component 3. The second axial portion 39 is located in the second mixing region 11*b* of the mixing chamber 11. The first means 38 and the second means 40 may include projections protruding radially outwards that plow through the corresponding material in the mixing chamber 11 as the stirrer 30 rotates.

Before the pressure regulating valve 51 of the valve device 50 is discussed in more detail, the operation of the mixing chamber 1 will be briefly described, focusing on the metering of the polyurethane or the polyurethane foam 5. Polyol with water as the first component 2 is fed to the first mixing region 11*a* through the first inlet opening 13. At the same time, air is injected into the first mixing region 11*a* through the gas inlet opening 15. By rotating the stirrer 30, and thus also by rotating the first means 38, the injected gas 4 is distributed into the first component 2. This creates small microbubbles of gas, which are finely distributed in the first component 2. The speed of the stirrer can be 1,000 to 6,000 rpm or 1,500 to 4,000 rpm.

Due to the pressure present in the first mixing region 11*a*, the premixture from the first mixing region 11*a* passes through the radial gap 34 into the second mixing region 11*b*. There, the premixture (polyol, water, microbubbles) is mixed with isocyanate (second component 3) by the second means 40. During the reaction of polyol, water, and isocyanate, $CO_2$ is produced in addition to polyurethane. The microbubbles act as nuclei for the formation of $CO_2$ bubbles, which form foam cells in the polyurethane. The polyurethane can be metered out of the mixing chamber 11 through the outlet opening 16. Due to the throttling effect of the flow brake and/or the radial gap 34, a (small) pressure gradient is created between the first mixing region 11*a* and the second mixing region 11*b*. The pressure gradient ensures that there is practically no flow from the second mixing region 11*b* into the first mixing region 11*a*. This prevents isocyanate or a mixture of isocyanate, polyol, and water from entering the first mixing region 11*a* and causing undesirable contamination there.

When a metering process is to be terminated, the stirrer 30 is moved from the position shown in FIG. 2 to the closing position in order to close the outlet opening 16. The drive shaft 12 is braked so that the stirrer 30 no longer rotates within the mixing chamber 11. The axial lowering of the stirrer tip 35 until it rests on the insert 20 and the running down of the stirrer 30 can be coordinated in such a way that the stirrer tip 35 cleans and clears the insert 20 by a residual rotation. At the same time, the valve device 50 is closed to prevent polyol from entering the valve device 50, or too much gas from accumulating in the first mixing region 11. Due to the closed valve device 51 and the closed outlet opening 16, the mixing chamber is sealed off from the environment after the metering process has ended. At the beginning of another metering process, the two components 2, 3 and the gas 4 are again fed into the mixing chamber, with the stirrer 30 rotating and axially displaced.

Figure 3:
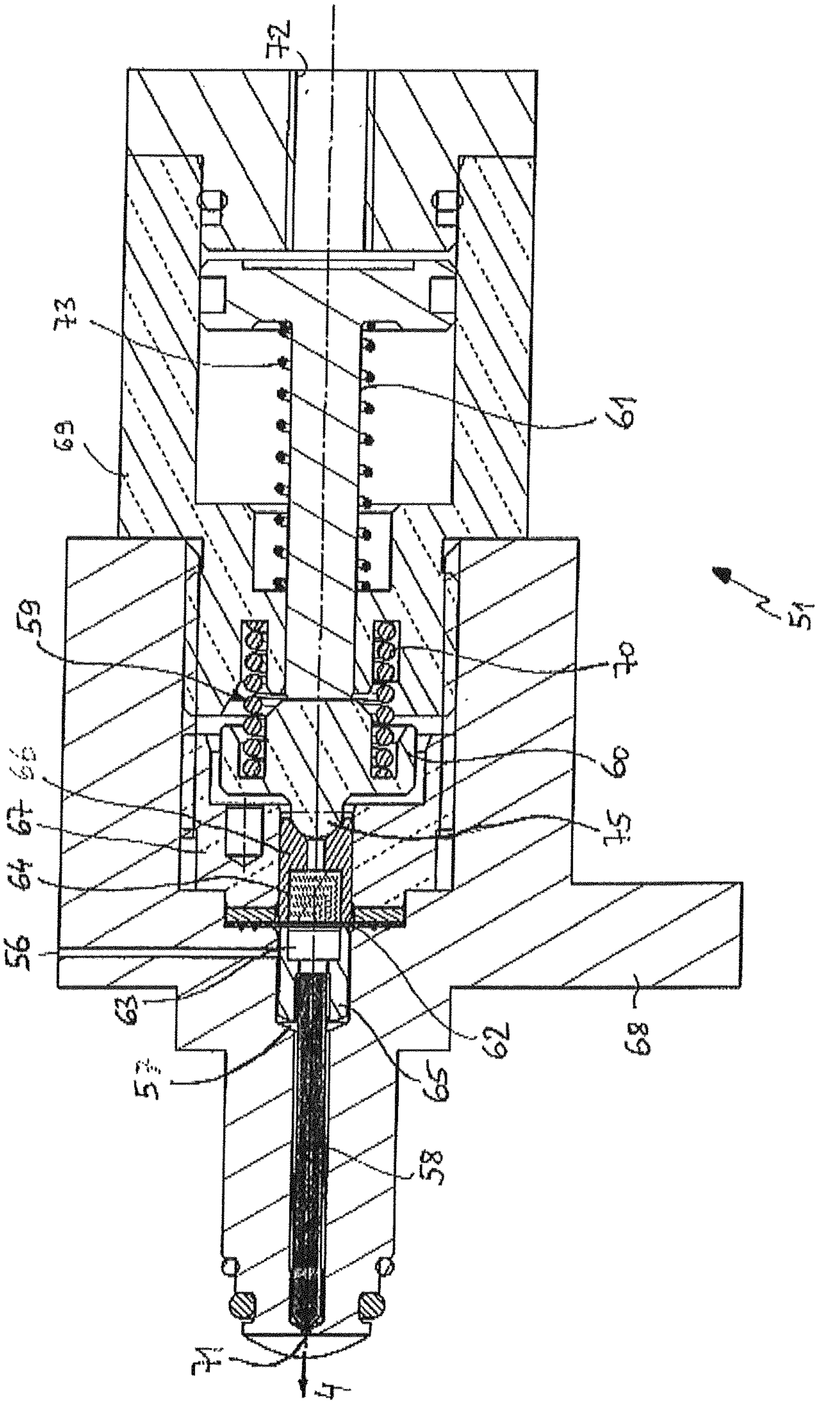
FIG. 3 shows a pressure regulating valve as part of a valve device according to the invention.

FIG. 3 shows the pressure regulating valve 51 on an enlarged scale. The pressure regulating valve 51 is designed as a needle valve that has a valve chamber 52, a needle 58 that can be moved in the valve chamber 52 as an actuator, and a piston unit 59 coupled to the needle 58. The piston unit 59 comprises a pressure guide piston 60 and a closing piston 61. Between the piston unit 59 and the needle 58, a membrane 62 is arranged, which defines and seals the valve chamber 57.

The coupling between the needle 58 and the piston unit 59 is achieved by two magnets 63, 64, which are designed as disc magnets made of neodymium. The magnetic force between these two magnets acts through the membrane 62. The needle 58 is firmly connected to the magnet 63 via a needle holder 65—for example, by means of an adhesive connection. The magnet 64 is inserted in an intermediate piece 66, against which magnet a spherical cap 75 of the pressure guide piston 60 rests. The membrane 62 is fixed in a valve housing 68 by a threaded sleeve 67.

A coil spring 70 is arranged between the pressure guide piston 60 and an axially adjustable abutment 69 in the form of a screw sleeve and presses the pressure guide piston 60 and thus also the needle 58 to the left in the illustration in FIG. 3. The force with which the coil spring 70 presses against the pressure guide piston 60 depends upon the axial position of the screw sleeve 69. The axial position can be precisely adjusted by turning the screw sleeve 69.

If the needle 58 is moved all the way to the left, it is in a closed position in which an outlet 71 of the pressure regulating valve 51 is closed. Via the membrane 62 and the intermediate piece 66, a force opposite to the force of the coil spring 70 acts upon the pressure guide piston 60, which force depends upon the pressure in the valve chamber 57 and/or upon the pressure at the inlet 56 of the pressure regulating valve 51. If the pressure guide piston 60 is in force equilibrium, the needle 58 is not moved within the valve chamber 57. If the pressure in the valve chamber 57 drops, the force that pushes the pressure guide piston 60 to the right in the illustration in FIG. 3 also drops. Accordingly, the needle 58 is displaced to the right due to the now no longer fully compensated force of the coil spring, wherein the outlet 71 is closed and/or the flow cross-section at the outlet 71 is reduced. This causes the pressure in the valve chamber 57 to rise again, with the result that the equilibrium of forces on the pressure guide piston 60 is restored.

The closing piston 61 serves to close the outlet 71 of the pressure regulating valve 51 when a metering process on the plastic metering device 1 and thus also the supply of the gas 4 are to be terminated. In this case, the closing piston 61 is pressurized with compressed air through an air supply 72, so that the closing piston presses against the pressure guide piston 60 against the force of another coil spring 73. This overrides the otherwise prevailing balance of forces between the pressure in the valve chamber 57 and the force of the coil spring 70. The needle 58 is thus moved into the closed position and held there, independently of the pressure in the valve chamber 57. If gas 4 is to flow out of the pressure regulating valve 51 again, the compressed air supply to the closing piston 61 is terminated. The coil spring 73 then presses the closing piston back into a rest position in which the closing piston 61 exerts no force on the pressure guide piston 60.

The connection unit 53, which is arranged between the outlet 55 of the mass flow controller 52 and the inlet 56 of the pressure regulating valve 51, comprises a check valve 74 (see FIG. 1) which protects the mass flow controller 52 from an entry of the first component 2 should the pressure regulating valve 51 be damaged and unable to prevent the flow of the first component 2 through the valve chamber 57.

LIST OF REFERENCE SIGNS

1 mixing chamber
2 first component
3 second component
4 gas
5 plastic (polyurethane foam)
6 expanding gas
10 mixing device
11 mixing chamber (11*a* first mixing region; 11*b* second mixing region)
12 drive shaft
13 first inlet opening
14 second inlet opening
15 gas inlet opening
16 outlet opening
17 axial end
18 nozzle
19 mixing chamber wall
20 insert
21 seal
30 stirrer
31 axis of rotation
32 pin-shaped shaft connection
33 shaft collar
34 radial gap
45 stirrer tip
36 outlet gap
37 first axial portion
38 first means
39 second axial portion
40 second means
50 valve device
51 pressure regulating valve
52 flow regulator/mass flow controller
53 connection unit
54 mass flow controller inlet
55 mass flow controller outlet
56 pressure regulating valve inlet
57 valve chamber
58 needle
59 piston unit
60 pressure guide piston
61 closing piston
62 membrane
63 magnet
64 magnet
65 needle holder
66 intermediate piece
67 threaded sleeve
68 valve housing
69 abutment/screw sleeve
70 coil spring
71 pressure regulating valve outlet
72 air supply 73 coil spring piston unit
74 check valve
75 spherical cap

The invention claimed is:

1. A valve device for injecting gas into at least one component located in a mixing chamber, the valve device comprising:

a pressure regulating valve having an inlet and an outlet, the pressure regulating valve defining a valve chamber, and the pressure regulating valve comprising:

a needle configured to move in the valve chamber;

a pressure guide piston coupled to the needle to fix an axial position of the needle based on a pressure in the valve chamber; and a closing piston configured to close the pressure regulating valve; and a flow regulator, wherein:

the inlet of the pressure regulating valve is in fluid communication with the outlet of the flow regulator, the outlet of the pressure regulating valve opens directly into the mixing chamber, and the pressure guide piston and the closing piston are independently axially moveable relative to one another.

2. The valve device of claim 1, further comprising a first spring arranged between the pressure guide piston and an adjustable abutment.

3. The valve device of claim 2, further comprising a second spring biased to press the closing piston into a rest position in which the closing piston and the pressure guide piston are decoupled from one another.

4. The valve device of claim 1, wherein, in a closing position of the needle, the closing piston presses against the pressure guide piston which in turn presses against the needle to hold the needle in the closing position.

5. The valve device of claim 1, wherein the needle, the pressure guide piston, and the closing piston are arranged coaxially with one another.

6. The valve device of claim 1, wherein the valve chamber is delimited by a membrane arranged between the needle and the pressure guide piston.

7. The valve device of claim 6, wherein the needle is coupled to the pressure guide piston by magnetic force.

8. The valve device of claim 7, further comprising magnets arranged on opposite sides of the membrane, wherein the magnetic force acts through the membrane.

9. The valve device of claim 7, further comprising a magnet arranged on one side of the membrane and a ferromagnetic counterpart is arranged on the opposite side of the membrane, wherein the magnetic force acts through the membrane.

10. The valve device of claim 1, wherein the needle is made of plastic or PEEK.

11. The valve device of claim 1, wherein a volume between the outlet of the flow regulator and the outlet of the pressure regulating valve is less than 5 $cm^3$.

12. The valve device of claim 1, further comprising a check valve between the outlet of the flow regulator and the inlet of the pressure regulating valve.

13. The valve device of claim 1, wherein the flow regulator is a mass flow controller.

14. The valve device of claim 13, wherein the mass flow controller comprises a calorimetric flow meter.

15. A metering device for metering of a foamed or foamable plastic, the metering device comprising the valve device of claim 1.

16. The valve device of claim 1, wherein the mixing chamber is in a plastic metering device.

17. A valve device for injecting gas into at least one component located in a mixing chamber, the valve device comprising:

a pressure regulating valve having an inlet and an outlet, the pressure regulating valve defining a valve chamber, and comprising:

a needle configured to move in the valve chamber;

a pressure guide piston coupled to the needle;

a closing piston configured to close the pressure regulating valve;

an axially adjustable abutment;

a first spring arranged between the pressure guide piston and the axially adjustable abutment; and a flow regulator, wherein:

the inlet of the pressure regulating valve is in fluid communication with the outlet of the flow regulator, the outlet of the pressure regulating valve opens directly into the mixing chamber, and the force with which the first spring presses against the pressure guide piston is based on the axial position of the axially adjustable abutment, which in turn fixes the axial position of the needle.

18. The valve device of claim 17, wherein the axially adjustable abutment is a screw sleeve.

19. A valve device for injecting gas into at least one component located in a mixing chamber, the valve device comprising:

a pressure regulating valve having an inlet and an outlet, the pressure regulating valve defining a valve chamber, and the pressure regulating valve comprising:

a needle configured to move in the valve chamber; and a piston unit coupled to the needle by magnetic force to fix an axial position of the needle based on a pressure in the valve chamber; and a flow regulator having an outlet, wherein:

the inlet of the pressure regulating valve is in fluid communication with the outlet of the flow regulator, the outlet of the pressure regulating valve opens directly into the mixing chamber, the valve chamber is delimited by a membrane arranged between the needle and the piston unit, and a magnet is arranged on one side of the membrane and the magnetic force acts through the membrane.

20. The valve device of claim 19, wherein another magnet or a ferromagnetic counterpart is arranged on the opposite side of the membrane.

* * * * *